United States Patent
Nakagawa

(10) Patent No.: US 8,102,607 B2
(45) Date of Patent: Jan. 24, 2012

(54) LENS UNIT AND IMAGE CAPTURING DEVICE

(75) Inventor: Youhei Nakagawa, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 42 days.

(21) Appl. No.: 12/645,679

(22) Filed: Dec. 23, 2009

(65) Prior Publication Data

US 2010/0157442 A1   Jun. 24, 2010

(30) Foreign Application Priority Data

Dec. 24, 2008 (JP) .................................. 2008-328840
Sep. 11, 2009 (JP) .................................. 2009-210784

(51) Int. Cl.
*G02B 13/18* (2006.01)
*G02B 9/34* (2006.01)

(52) U.S. Cl. .......................... 359/715; 359/772; 359/775

(58) Field of Classification Search .......... 359/708–715, 359/754–757, 763–765, 771, 772, 775
See application file for complete search history.

(56) References Cited

U.S. PATENT DOCUMENTS

| 7,710,666 | B2* | 5/2010 | Tsai ............................... 359/772 |
| 2009/0128927 | A1* | 5/2009 | Chen et al. .................... 359/715 |
| 2010/0165483 | A1* | 7/2010 | Tang et al. .................... 359/715 |
| 2010/0265593 | A1* | 10/2010 | Tang ............................ 359/663 |

FOREIGN PATENT DOCUMENTS

| JP | 2002-228922 | 8/2002 |
| JP | 2006-309043 | 11/2006 |
| JP | 2007-011237 | 1/2007 |

* cited by examiner

*Primary Examiner* — Darryl J Collins
(74) *Attorney, Agent, or Firm* — Occhiuti Rohlicek & Tsao LLP

(57) ABSTRACT

A lens unit including a first lens, an aperture stop, a second lens, a third lens, and a fourth lens arranged in order from an object side to an image side. The first lens is a meniscus lens having positive power. The second lens is a meniscus lens including a convex object side surface and having negative power. The third lens is a meniscus lens including a convex image side surface and having negative power. The fourth lens is aspherical, includes an image side surface and an object side surface, and has at least one inflection point on each of the image side surface and object side surface. The image side surface has a concave surface facing toward the image side.

5 Claims, 18 Drawing Sheets

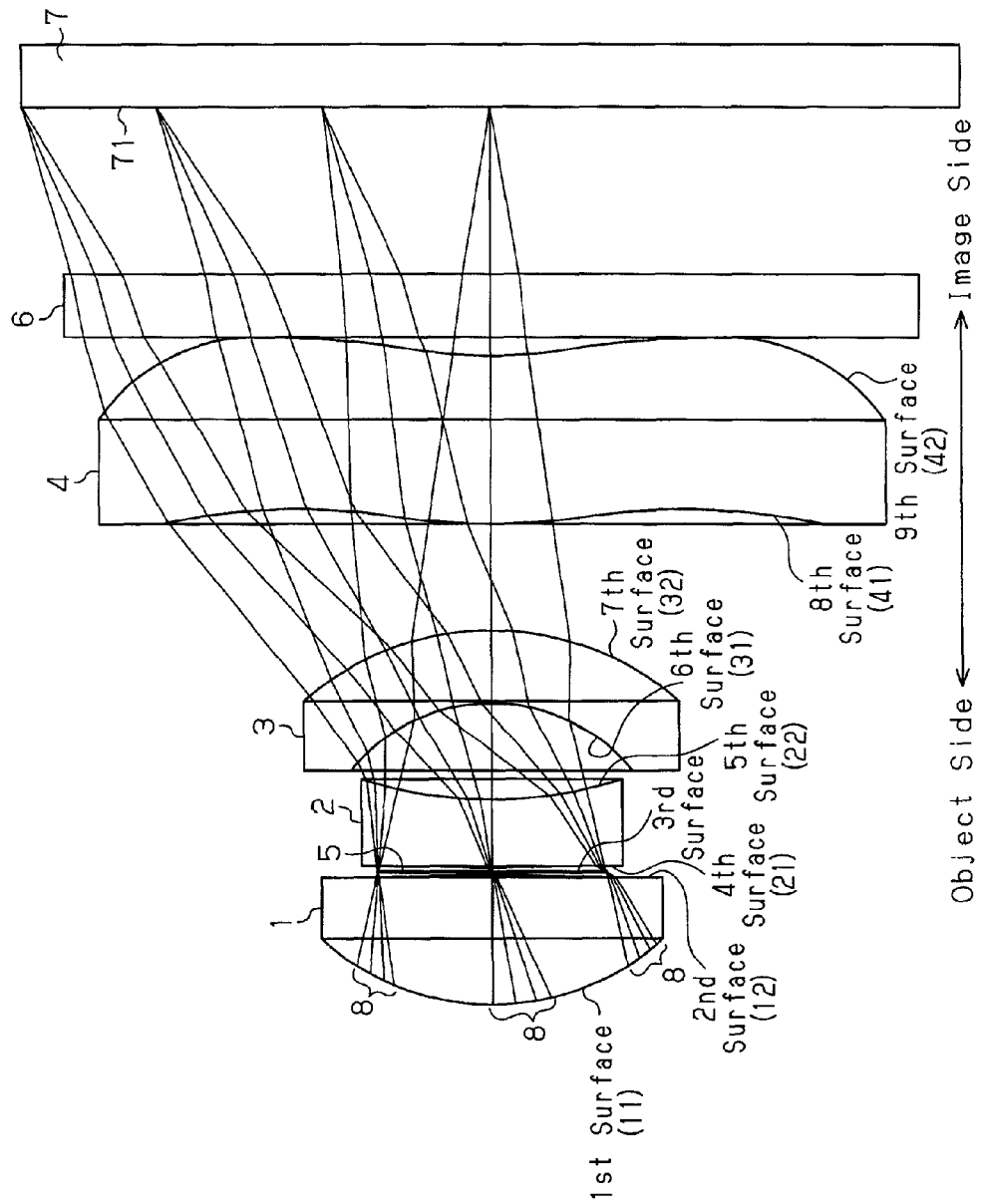

Spot Diagram

Spot Diagram

LENS UNIT AND IMAGE CAPTURING DEVICE

CROSS-REFERENCE TO RELATED APPLICATIONS

This application is based upon and claims the benefit of priority from prior Japanese Patent Application Nos. 2008-328840, filed on Dec. 24, 2008, and 2009-210784, filed on Sep. 11, 2009, the entire contents of which are incorporated herein by reference.

BACKGROUND OF THE INVENTION

The present invention relates to a lens unit, and more particularly, to a lens unit suitable for use in a compact image capturing device. Further, the present invention relates to an image capturing device.

Most of image capturing devices that are presently being used are digital cameras, which employ charged coupled device (CCD) image sensors or complementary metal oxide semiconductor (CMOS) image sensors as image capturing elements. Thus, such an image capturing device must use a lens unit of which capacities differ from that of a so-called silver salt camera. For example, the sensitivity to diagonal incident light is lower in a CCD image sensor or CMOS image sensor than in a silver salt film. Thus, a CCD image sensor or CMOS image sensor must have a small chief ray angle (CRA), which is the incident angle of light rays entering an image capturing device. Due to the improvements made on the integration of image capturing elements, the image quality must be improved even for image capturing devices used in compact cameras or mobile phones. At the same time, such an image capturing device must be further reduced in size. Furthermore, an image capturing device that is compact and used in a compact camera or mobile phone must have a structure that lowers manufacturing costs so that relatively inexpensive products can be supplied.

To improve the image quality, aberrations must be lowered. Thus, instead of a lens unit having a three-lens structure, which may easily be designed to be compact, it is desirable that a lens unit having a four-lens structure be used, which more easily suppresses aberrations. Japanese Laid-Open Patent Publication Nos. 2002-228922, 2006-309043, and 2007-11237 describe compact lens units having four-lens structures. The four-lens structures of the publications will be discussed below.

Japanese Laid-Open Patent Publication No. 2002-228922 describes a so-called front stop lens system in which the stop is located further toward an image capturing side (hereinafter referred to as the "object side") from all the lenses of the lens unit. In such a structure, it is generally known that when misalignment occurs in a lens located toward an image capturing element side (hereinafter referred to as the "image side") from the stop, the misalignment greatly affects the image quality. As a result, there is a tendency for product defects to occur due to such misalignment. This lowers the manufacturing yield of the lens unit and increases manufacturing costs.

Japanese Laid-Open Patent Publication No. 2006-309043 describes a so-called rear stop lens system in which the stop is located rearward from two object side lenses. It is generally known that such a structure increases the CRA. However, as described above, the lens unit for a digital camera must have a small CRA. Thus, the refractive index of each lens must be adjusted to decrease the CRA. However, if the thickness of each lens were to be increased to adjust the refractive index, this would increase the length of the entire lens unit and thereby enlarge the lens unit.

Japanese Laid-Open Patent Publication No. 2007-11237 describes a so-called middle stop lens system in which a stop is arranged between the two lenses located closest to the object, that is, between the first and second lenses from the object side. It is generally known that a misalignment would less affect the image quality in comparison to a front stop lens system and have a smaller CRA than a rear stop lens system.

SUMMARY OF THE INVENTION

The lens system of Japanese Laid-Open Patent Publication No. 2007-11237 includes a first lens formed by a positive lens, a second lens formed by a negative lens having a concave image side surface, a third lens formed by a positive meniscus lens having two aspherical surfaces including a concave object side surface, and a fourth lens formed by a meniscus lens having two aspherical surfaces that are bulged toward the object in the vicinity of the optical axis (refer to claim 1 of the '237 publication). Specifically, Japanese Laid-Open Patent Publication No. 2007-11237 teaches the use of a negative lens as the second lens to suppress the influence of the positive lens on chromatic aberration of magnification and axial chromatic aberration.

In this lens system, to minimize chromatic aberration only with the second lens, the second lens must have strong negative power. It is known that when a single lens has strong negative power, a lens misalignment easily affects the image quality. Thus, the manufacturing of the lens system described in Japanese Laid-Open Patent Publication No. 2007-11237 requires management for decreasing the misalignment tolerance and adversely affects the yield.

The present invention provides a middle stop lens unit having a four-lens structure that improves product yield by minimizing product defects caused by misalignments.

In this specification, the term "image capturing device" includes a device that records the light entering a lens unit onto a recording medium as a still picture or a moving picture and a device that shows the light entering a lens unit on a display or the like. Examples of an image capturing device include a camera, a video camera, and a mobile phone equipped with a camera.

One aspect of the present invention is a lens unit including a first lens, an aperture stop, a second lens, a third lens, and a fourth lens arranged in order from an object side to an image side. The first lens is a meniscus lens having positive power. The second lens is a meniscus lens including a convex object side surface and having negative power. The third lens is a meniscus lens including a convex image side surface and having negative power. The fourth lens is aspherical, includes an image side surface and an object side surface, and has at least one inflection point on each of the image side surface and object side surface. The image side surface has a concave surface facing toward the image side.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 includes external views illustrating the portable terminal when in use.

FIG. 3 is a schematic cross-sectional view of a lens unit according to a preferred embodiment of the present invention taken along a plane which includes the optical axis of the lens unit;

DETAILED DESCRIPTION OF THE PREFERRED EMBODIMENTS

Figure 1:
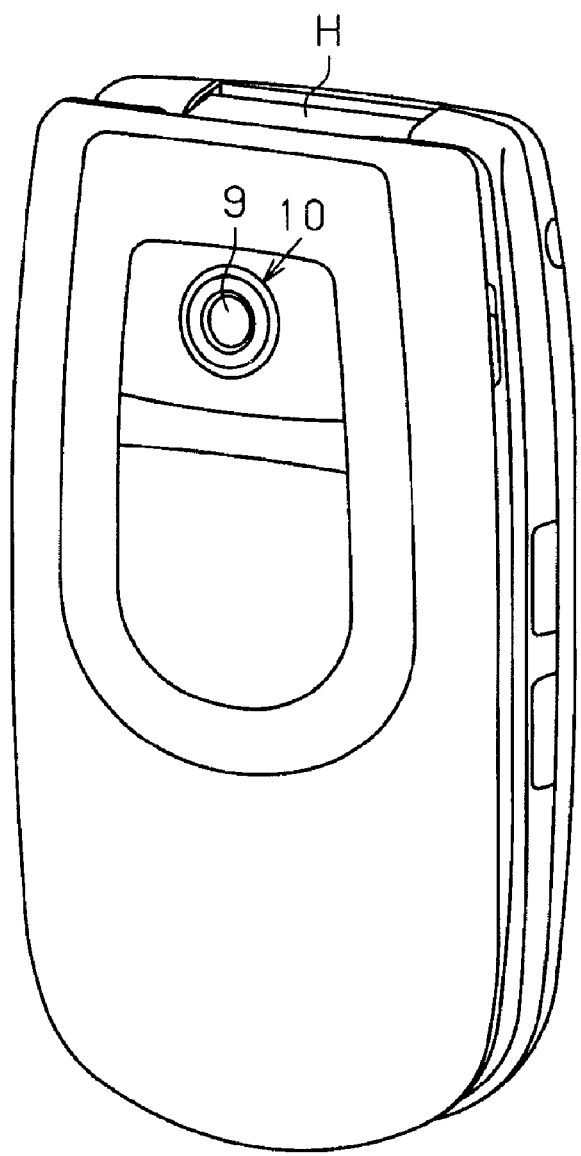
FIG. 1 is an external view illustrating the outer appearance of a portable terminal when not in use.
Figure 2A:
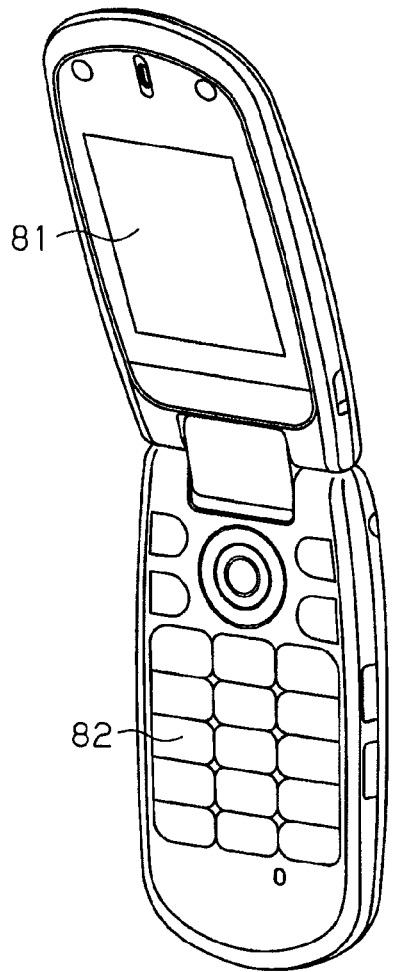
FIG. 2(a) is a front perspective view and FIG. 2(b) is a rear perspective view.
Figure 2B:
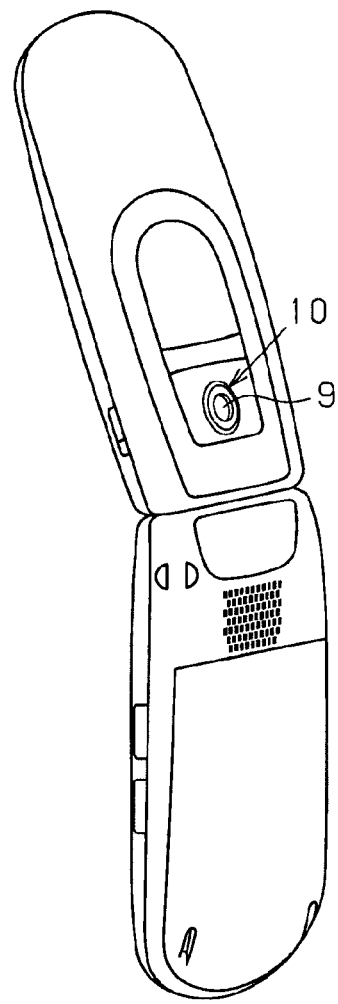

FIG. 1 illustrates a mobile phone foldable about a hinge H. As illustrated in FIG. 2(a), a display 81 and an operation panel 82 become exposed when opening the mobile phone. As illustrated in FIGS. 1 and 2(b), a cover glass 9 of a lens unit 10 is exposed through a camera window from the outer surface of the mobile phone. To capture the image of an object, a user opens the mobile phone, directs the cover glass 9 toward the object, and operates the operation panel 82 to release the shutter.

Referring to FIG. 3, the lens unit 10 is a middle stop lens unit including, in order of arrangement from the object side toward the image side, a first lens 1, an aperture stop 5, a second lens 2, a third lens 3, a fourth lens 4, and a cover glass 6. Members that particularly do not have to be described, such as the cover glass 9 and frame, are not illustrated in FIG. 3. FIG. 3 illustrates a CCD image sensor 7, which is not an element of the lens unit, to illustrate an imaging plane 71.

FIG. 3 also illustrates incident light rays 8. The structure of the lens unit 10 will now be described in detail.

The first lens 1 is a meniscus lens having positive power and may be referred to as a positive meniscus lens or a convex meniscus lens. The first lens 1 has an object side surface 11 (first surface), which is convex at the object side, and an image side surface 12 (second surface), which is concave at the image side. Among the lenses of the lens unit 10, the first lens 1 is located closest to the object and serves as the front-most lens.

The second lens 2 is a meniscus lens having negative power and may be referred to as a negative meniscus lens or concave meniscus lens. The second lens 2 has an object side surface 21 (fourth surface), which is convex toward the object side, and an image side surface 22 (fifth surface), which is concave toward the image side.

The third lens 3 is a meniscus lens having negative power. The third lens 3 has an object side surface 31 (sixth surface), which is concave toward the object side, and an image side surface 32 (seventh surface), which is convex toward the image side.

The fourth lens 4 is an aspherical lens having positive power. The fourth lens 4 has an object side surface 41 (eighth surface) and an image side surface 42 (ninth surface), each of which is aspherical and includes at least one inflection point. The image side surface 42 of the fourth lens 4 includes a concave surface facing toward the image side.

In one example, the first lens 1, second lens 2, third lens 3, and fourth lens 4 are all plastic lenses. The second lens 2 and third lens 3 each have an Abbe number that is smaller than that of the first lens 1.

The first lens 1 is a positive lens and thus concentrates incident light. However, the first lens 1 is a meniscus lens and a misalignment less affects image quality than a biconvex lens. The first lens 1 will now be compared with a biconvex type positive lens.

Figure 4:
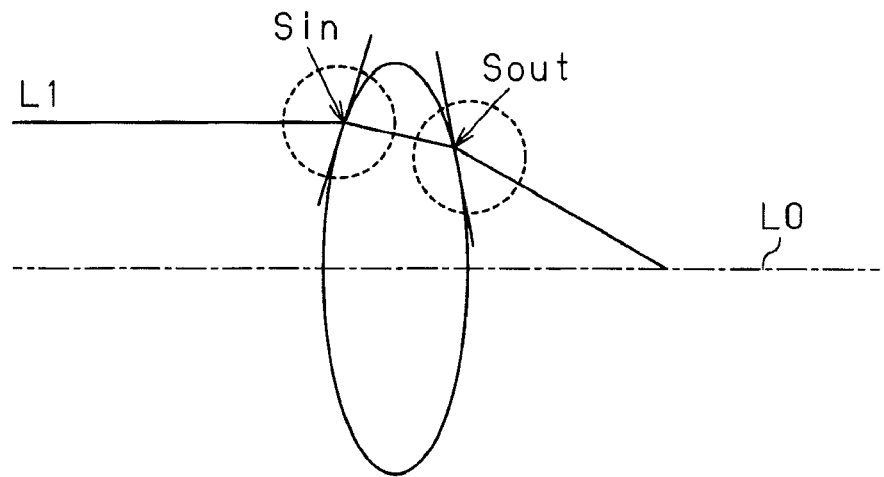
FIG. 4 is an optical path diagram illustrating a biconvex lens in a misaligned state.

Generally, as light enters a lens, aberration such as spherical aberration occurs except when the light enters the lens in a direction orthogonal to a tangent plane of the lens. For example, as illustrated in FIG. 4, when incident light L1 parallel to the optical axis L0 of a biconvex lens enters the peripheral portion of the biconvex lens, aberration occurs at each of an incidence surface Sin and an emission surface Sout. To correct such aberration, the following lenses may be formed so as to offset the aberration. Alternatively, the biconvex lens may be aspherical so that the aberration at the emission surface Sout offsets the aberration at the incidence surface Sin.

When a lens is misaligned, the incidence surface Sin and the emission surface Sout are both displaced. Thus, the incident light L1 does not pass through the intended positions of incidence and emission. As a result, even if the lens is formed so that the aberration at the emission surface Sout offsets the aberration at the incidence surface Sin in a state free from misalignment, when a misalignment occurs, the aberration at the emission surface Sout would not offset the aberration at the incidence surface Sin but rather increase the aberration.

Figure 5:
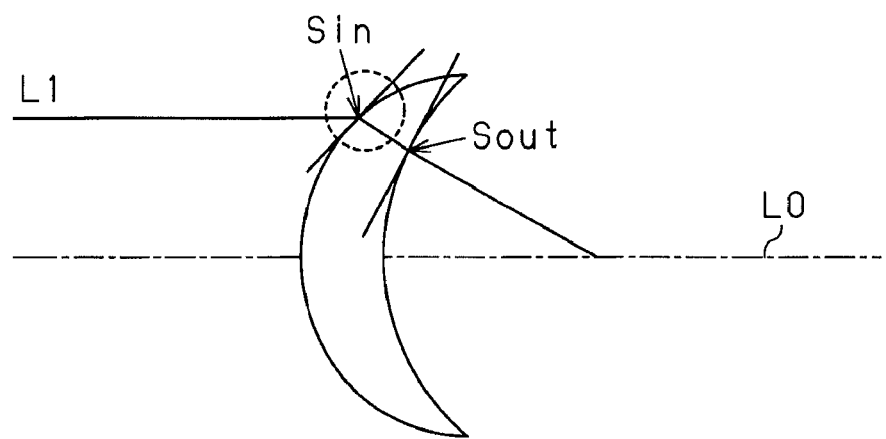
FIG. 5 is an optical path diagram illustrating a meniscus lens in a misaligned state.
Figure 6:
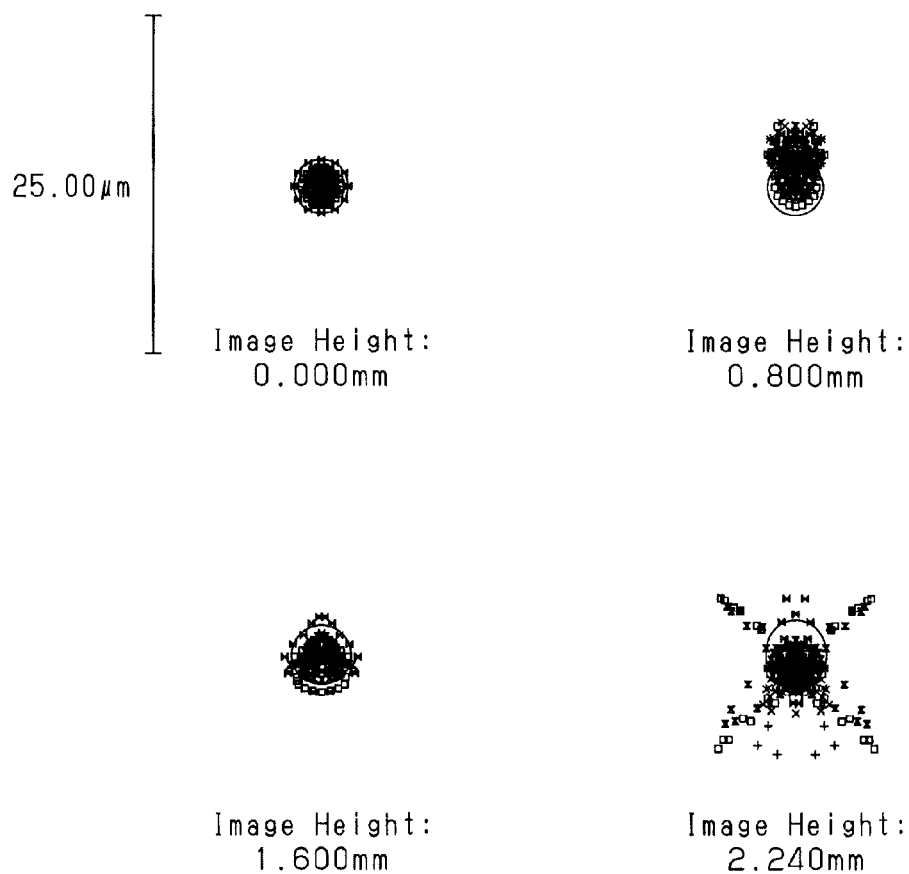
FIG. 6 is a spot diagram illustrating a lens unit of example 1.
Figure 7:
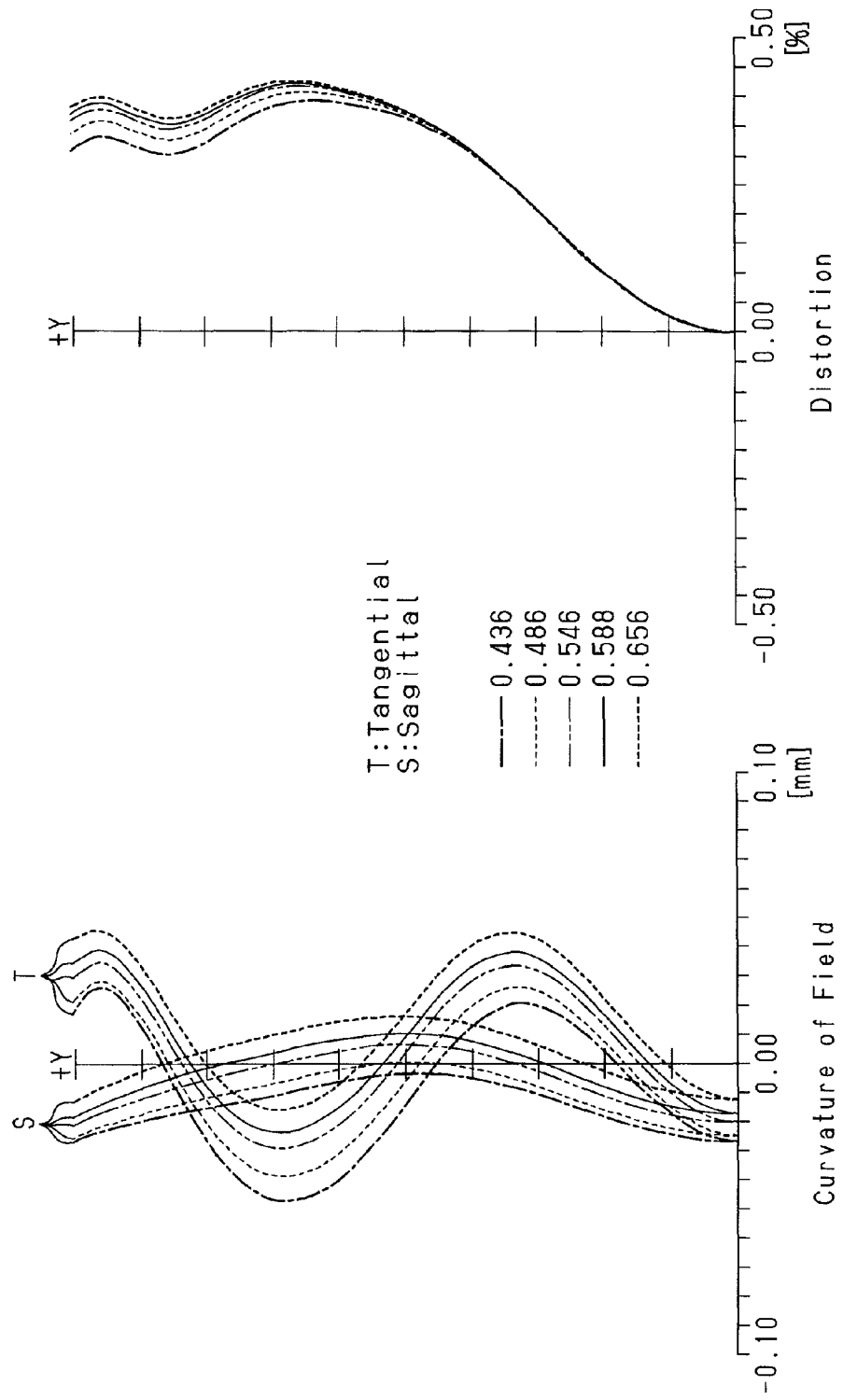
FIGS. 7(a) and 7(b) are graphs respectively illustrating the curvature of field and distortion in the lens unit of example 1.
Figure 8:
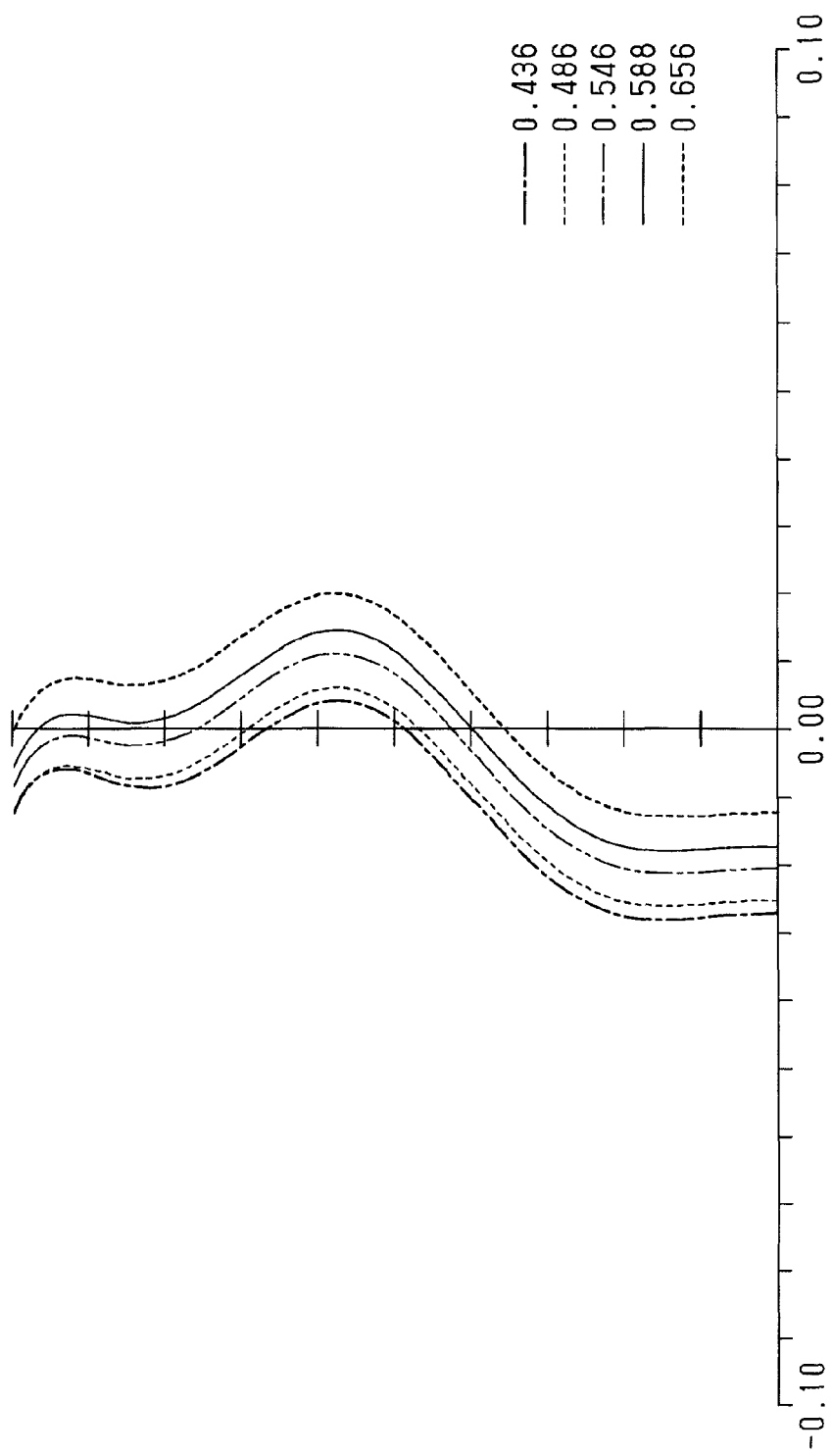
FIG. 8 is a graph illustrating the longitudinal aberration in the lens unit of example 1.
Figure 9:
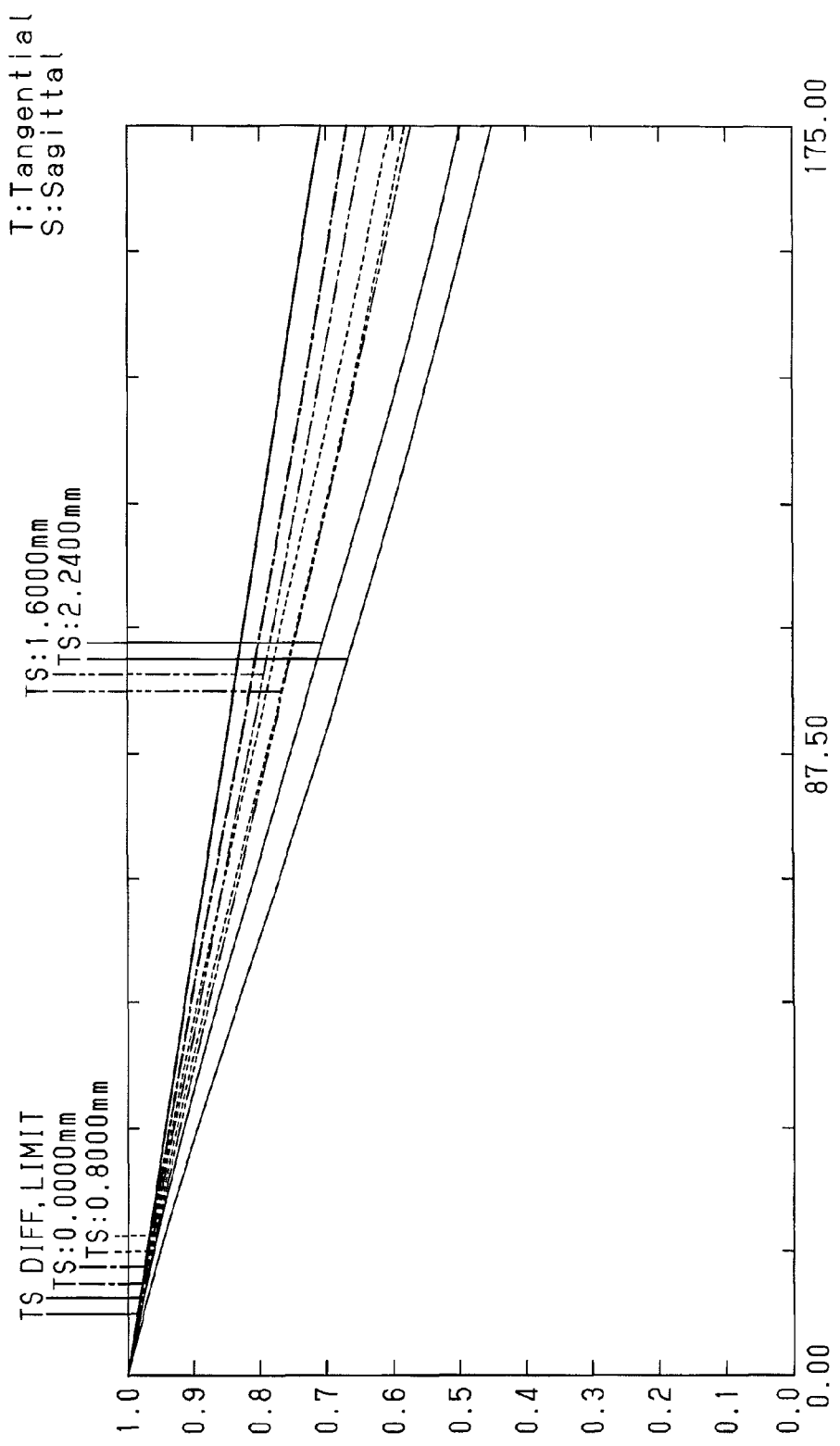
FIG. 9 is a graph illustrating the transfer function (MTF) of the lens unit of example 1.

In this embodiment, the first lens 1 is a meniscus lens as illustrated in FIG. 5. When incident light L1 parallel to the optical axis L0 enters the peripheral portion of the meniscus lens, aberration occurs at the incidence surface Sin. However, the light emitted from the emission surface Sout is generally orthogonal to the emission surface Sout. Thus, aberration is reduced at the emission surface Sout. Nevertheless, the aberration must still be corrected. Thus, the following lenses must be formed to offset the aberration. Otherwise, a biconvex lens having aspherical surfaces and formed so that the aberration at the emission surface Sout offsets the aberration at the incidence surface Sin must be used.

Misalignment may occur in a meniscus lens. The incidence surface Sin and the emission surface Sout of the misaligned meniscus lens are both displaced. Thus, the incident light L1 does not pass through the intended positions of incidence and emission. As a result, even if the meniscus lens is formed so that the aberration at the emission surface Sout offsets the aberration at the incidence surface Sin in a state free from misalignment, when a misalignment occurs, the aberration at the emission surface Sout would not offset the aberration at the incidence surface Sin. However, light is emitted from a meniscus lens generally orthogonal to the emission surface. Thus, in comparison to a biconvex lens, the influence of a misalignment at the emission surface of a meniscus lens is small. As a result, in comparison with a biconvex lens that is affected by a misalignment at the incidence surface Sin and the emission surface Sout, the use of a meniscus lens prevents increasing the aberration due to a misalignment.

The second lens 2 and third lens 3 are both negative lenses and thus correct chromatic aberration caused by the first lens 1, which is a positive lens, in a satisfactory manner. Particularly, the lens unit of the present embodiment, in which the second lens 2 and the third lens 3 are both negative lenses, differs from the lens unit described in Japanese Laid-Open Patent Publication No. 2007-11237, in which only the second lens is a negative lens. This reduces the burden on the second lens 2. Accordingly, the second lens 2 may have a smaller curvature and other aberrations may be suppressed. Further, the second lens 2 and third lens 3 each have an Abbe number that is smaller than that of the first lens 1. This further increases the chromatic aberration correction effect.

Additionally, the fourth lens 4 is a positive lens and thus prevents positive power from concentrating at the first lens 1, which is a positive lens. In other words, since the curvature of the first lens 1 may be decreased, the occurrence of aberration may be suppressed.

The lens unit of the above-described embodiment has the advantages described below.

(1) In the lens unit of the above-described embodiment, in addition to the second lens 2, the third lens also has negative power. Thus, in comparison with the prior art in which the third lens is a positive lens, the negative power of the second lens 2 is decreased. Accordingly, displacement of the optical path may be minimized when a misalignment occurs and product defects caused by misalignment are reduced.

(2) A meniscus lens, which is less affected by misalignments than a biconvex lens, is used as the first lens 1. This further reduces product defects that would be caused by a misalignment.

(3) In the above-described embodiment, the fourth lens 4 has positive power. Thus, when comparing the lens unit of the above-described embodiment with a lens unit having the same focal length, the positive power of the first lens 1 may be decreased. This further reduces product defects that would be caused by a misalignment.

(4) In the above-described embodiment, the second lens 2 and the third lens 3 each have an Abbe number that is smaller than that of the first lens 1. Thus, in comparison with the prior art, the above-described embodiment has a greater chromatic aberration correction effect.

(5) In the above-described embodiment, since the lens unit 10 has the effect described above, an image capturing device equipped with the lens unit 10 may be easily reduced in size and be made lighter. Further, the lens unit 10 is subtly affected by temperature changes.

It should be apparent to those skilled in the art that the present invention may be embodied in many other specific forms without departing from the spirit or scope of the invention. Particularly, it should be understood that the present invention may be embodied in the following forms.

In the above-described embodiment, the fourth lens 4 is a positive lens but may be another type of lens. For example, as long as an increase in the curvature of the first lens 1 may be tolerated, the fourth lens 4 may be a negative lens. In such a case, the back focus and flange focus may be lengthened and the CRA may be easily decreased.

In the above-described embodiment, each of the first to fourth lenses 1 to 4 is a plastic lens but instead may be a glass lens as long as the same optical characteristics can be maintained. The use of glass lenses increases heat resistance. Further, thermal volume changes are smaller in glass than plastic. This suppresses image deterioration caused by the lens shape that changes in accordance with the temperature.

The cover glass 6 does not necessarily have to be arranged between the fourth lens 4 and the CCD image sensor 7 like in the above-described embodiment. For example, a filter or the like that cuts infrared light may be used in lieu of or in addition to the cover glass 6.

In the above-described embodiment, the CCD image sensor 7 is used as the image capturing element. However, other structures may be used for the image capturing element. For example, a CMOS image sensor may be used.

In the above-described embodiment, the CCD image sensor 7 is used as the image capturing element. However, other structures may be used for the image capturing element. For example, an optical film may be used as the image capturing element in an image capturing device for silver salt photographs.

In the preferred embodiment, the image capturing device is used in a portable terminal but may also be used in a normal camera or personal computer. Further, the image capturing device may be used not only for capturing still images but also for capturing moving pictures.

Examples of the above-described embodiment will now be discussed.

Example 1

Referring to FIG. 3, the lens unit of example 1 may be used for the image capturing device of the above-described embodiment. The design conditions for the lens unit are as shown below.
Focal length of entire system: 3.79 mm
F-number: 2.8
Entire lens length: 4.28 mm
Back focus: 1.19 mm
Effective image height: Φ4.5 mm The lens data (unit is millimeters) is shown in Table 1. In Table 1, a number i is allocated for each surface in order from the object side of the first lens 1, which serves as the first surface as illustrated in FIG. 3, toward the image side. Further, Ri represents the radius of curvature of each surface, Di represent the distance between the ith surface and the (i+1)th surface, and radius refers to the effective radius.

TABLE 1

| Surface No. | Ri | Di | Material | Radius |
|---|---|---|---|---|
| Object | ∞ | ∞ | | |
| 1* | 1.149 | 0.614 | E48R | 0.815 |
| 2* | 206.194 | 0.018 | | 0.623 |

TABLE 1-continued

| Surface No. | Ri | Di | Material | Radius |
|---|---|---|---|---|
| 3 (Stop) | ∞ | 0.025 | | 0.545 |
| 4* | 215.053 | 0.322 | SP1516 | 0.580 |
| 5* | 2.790 | 0.451 | | 0.625 |
| 6* | −1.141 | 0.352 | SP1516 | 0.672 |
| 7* | −1.716 | 0.502 | | 0.895 |
| 8* | 1.829 | 0.806 | E48R | 1.581 |
| 9* | 1.979 | 0.092 | | 1.879 |
| 10 | ∞ | 0.300 | B270 | 1.983 |
| 11 | ∞ | 0.795 | | 2.040 |
| 12 | ∞ | 0.000 | | 2.240 |
| Image | ∞ | — | | |

In Table 1, the first lens 1 and the fourth lens 4, which are formed from E48R, are plastic lenses manufactured by Zeon Corporation and have a refractive index nd of 1.531 and an Abbe number vd of 56.0. Further, the second lens 2 and third lens 3, which are formed from SP1516, are plastic lenses formed by Teijin Chemicals Ltd. and have a refractive index nd of 1.6142 and an Abbe number vd of 26.0. Accordingly, the second lens 2 and third lens 3 each have an Abbe number that is smaller than that of the first lens 1 and thereby further increases the chromatic aberration correction effect. The cover glass 6, which is formed from B270, is a glass plate manufactured by Schott AG and has a refractive index nd of 1.523 and an Abbe number vd of 58.6.

The aspherical shape is represented by the formula (I) shown below.

$$z = \frac{(1/R)H^2}{1+\sqrt{\{1-(1+K)(H/R)^2\}}} + A4H^4 + A6H^6 + A8H^8 + A10H^{10} + A12H^{12} + A14H^{14} + A16H^{16} \quad (1)$$

In formula (I), the z axis represents the optical axis of the lens, R represents the radius of curvature, H represents the height in a direction perpendicular to the optical axis, and K represents the Korenich constant. Further, A4, A6, A8, A10, A12, A14, and A16 respectively represent the aspherical surface coefficients for the fourth order, sixth order, eighth order, tenth order, twelfth order, fourteenth order, and sixteenth order.

The aspherical surface coefficient of each surface is as shown below in Table 2.

TABLE 2

| Ri | K | A4 | A6 | A8 | A10 | A12 | A14 | A16 |
|---|---|---|---|---|---|---|---|---|
| 1st surface | −2.373E−03 | 5.306E−02 | −4.735E−01 | 2.159E+00 | −5.454E+00 | 6.947E+00 | −3.843E+00 | −3.133E−02 |
| 2nd surface | 9.883E+04 | −1.526E−02 | −1.014E−01 | −1.728E−01 | 9.344E−02 | −4.040E−01 | 4.457E−01 | 0 |
| 4th surface | −1.000E+03 | 3.056E−02 | −6.841E−03 | −1.207E−01 | −5.793E−01 | 1.792E+00 | −1.510E−01 | 0 |
| 5th surface | 2.435E−01 | 1.304E−01 | −5.488E−01 | 4.486E+00 | −1.442E+01 | 1.907E+01 | 2.331E+00 | −1.397E+01 |
| 6th surface | −1.408E−01 | −8.182E−01 | 4.452E+00 | −2.452E+01 | 7.070E+01 | −9.018E+01 | 3.682E−01 | 6.611E+01 |
| 7th surface | 2.819E−02 | −5.554E−01 | 1.442E+00 | −3.605E+00 | 6.169E+00 | −5.609E+00 | 2.287E+00 | −1.343E−01 |
| 8th surface | −8.585E−02 | −4.115E−01 | 3.714E−01 | −2.949E−01 | 1.714E−01 | −6.389E−02 | 1.301E−02 | −1.087E−03 |
| 9th surface | −2.710E−02 | −2.498E−01 | 1.253E−01 | −5.793E−02 | 1.517E−02 | −1.729E−03 | −4.699E−05 | 1.355E−05 |

The optical characteristics of the lens units, that is, the spot diaphragm, curvature of field, distortion, longitudinal aberration, and MTF curve are respectively illustrated in FIGS. 6, 7(a), 7(b), 8, and 9.

Example 2

Figure 10:
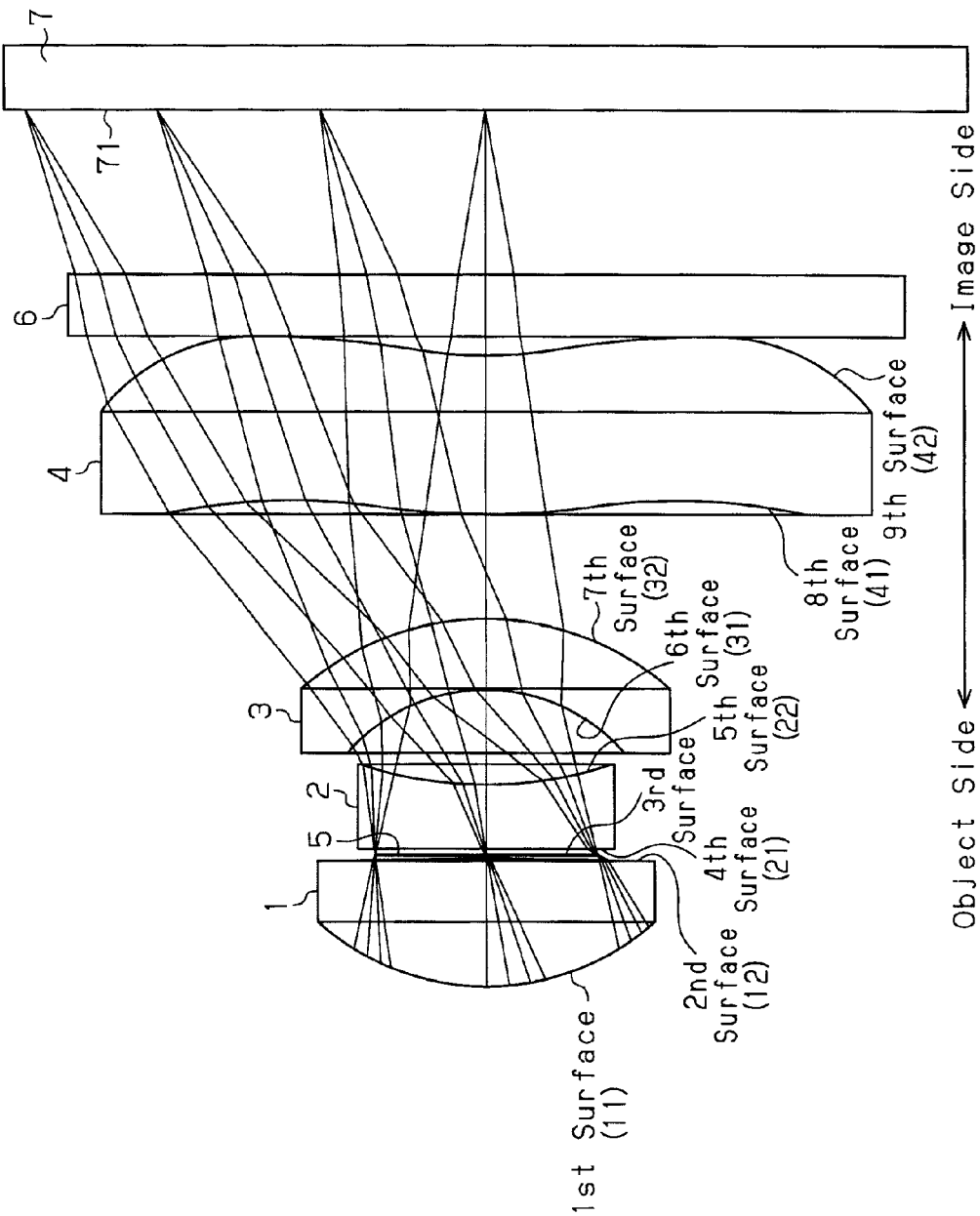
FIG. 10 is a schematic cross-sectional view of a lens unit of example 2 taken along a plane which includes the optical axis of the lens unit.
Figure 11:
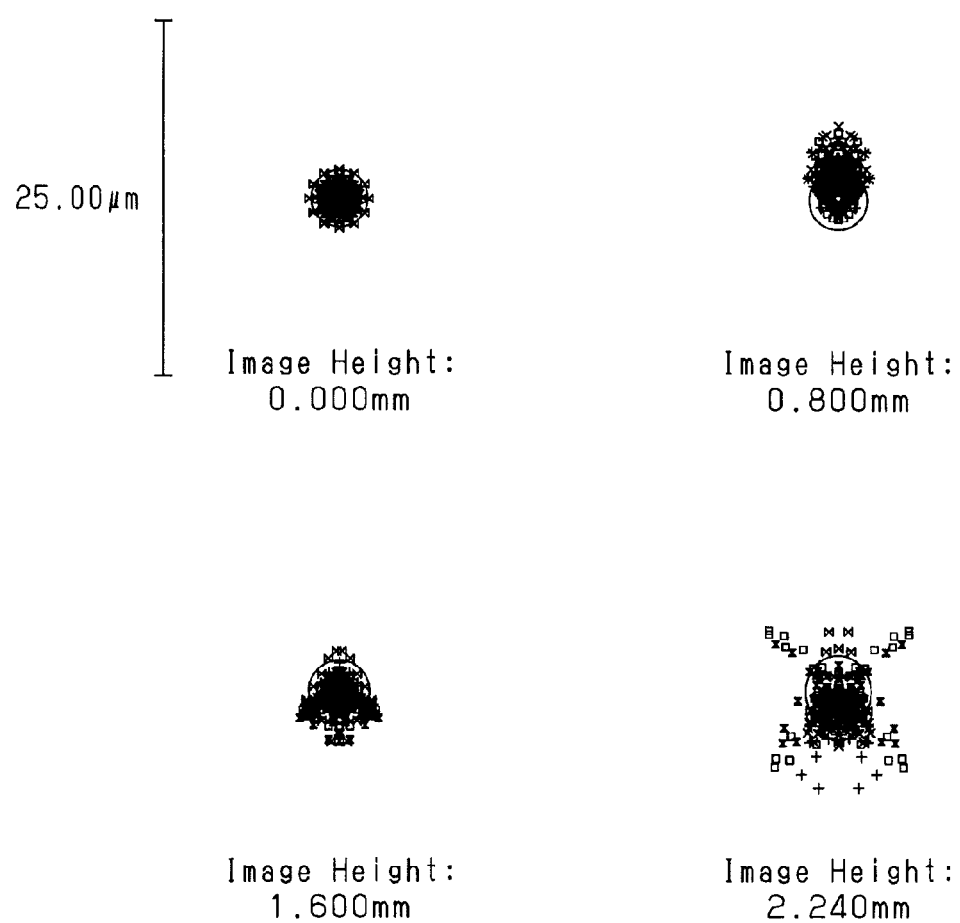
FIG. 11 is a spot diagram illustrating the lens unit of example 2.
Figure 12A:
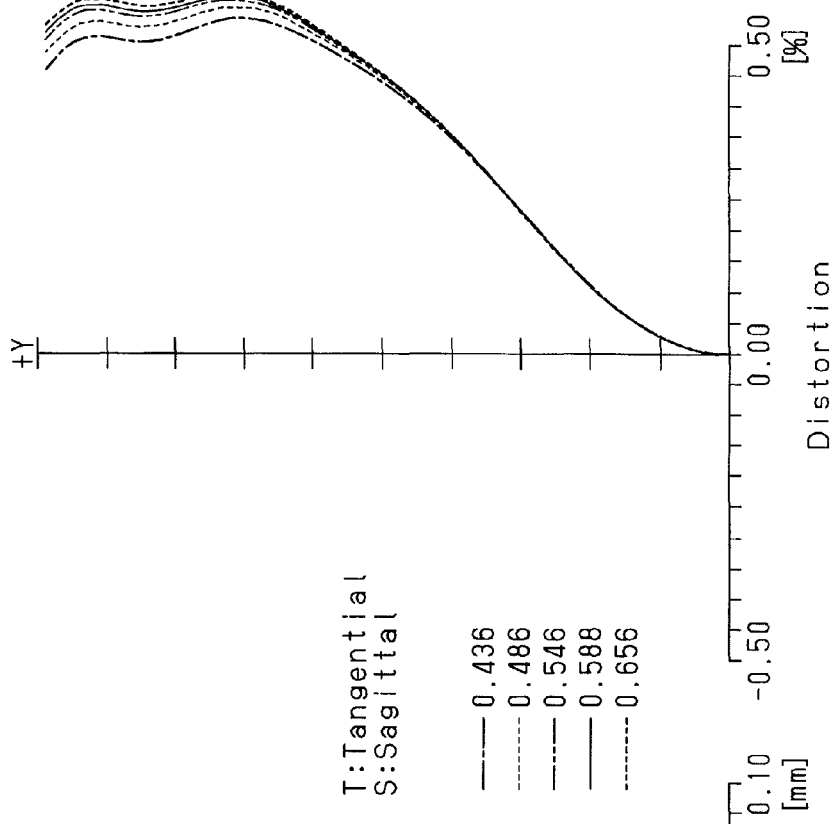
FIGS. 12(a) and 12(b) are graphs respectively illustrating the curvature of field and distortion in the lens unit of example 2.
Figure 12B:
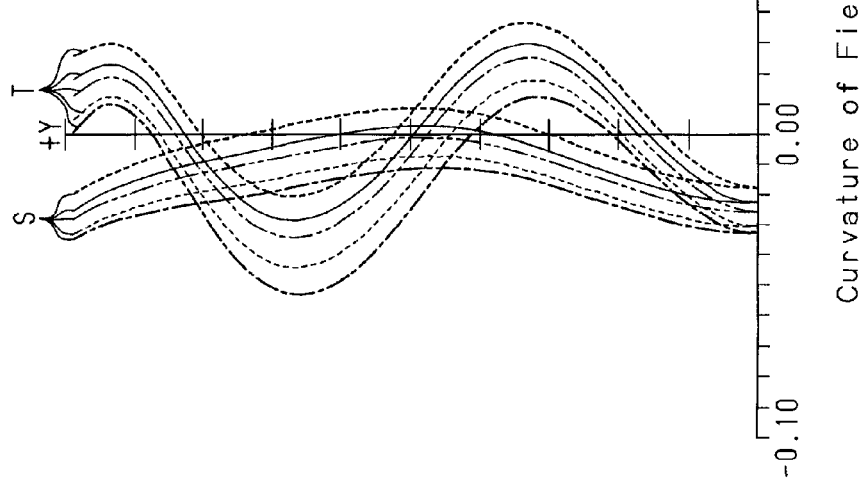
Figure 13:
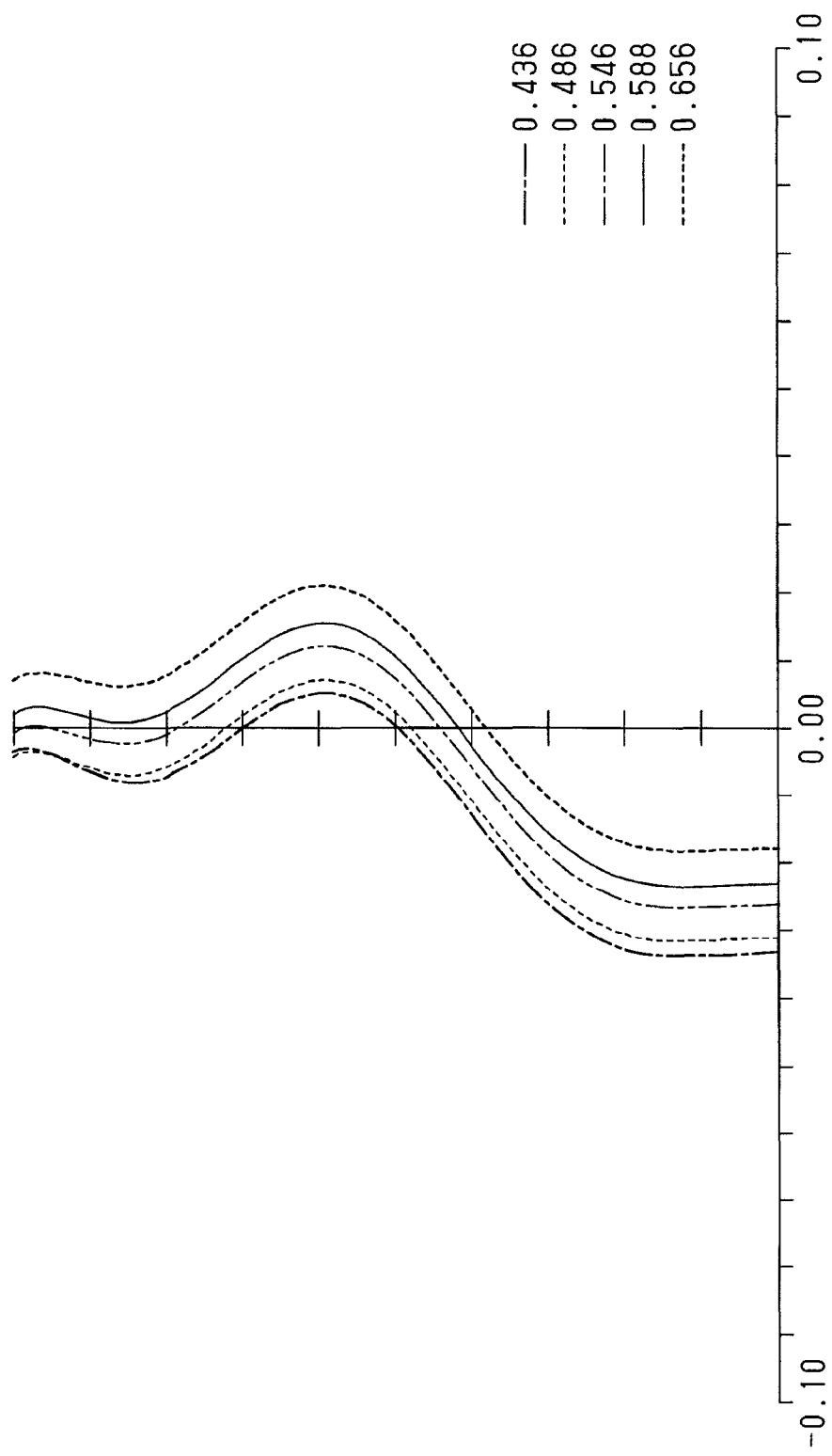
FIG. 13 is a graph illustrating the longitudinal aberration in the lens unit of example 2.
Figure 14:
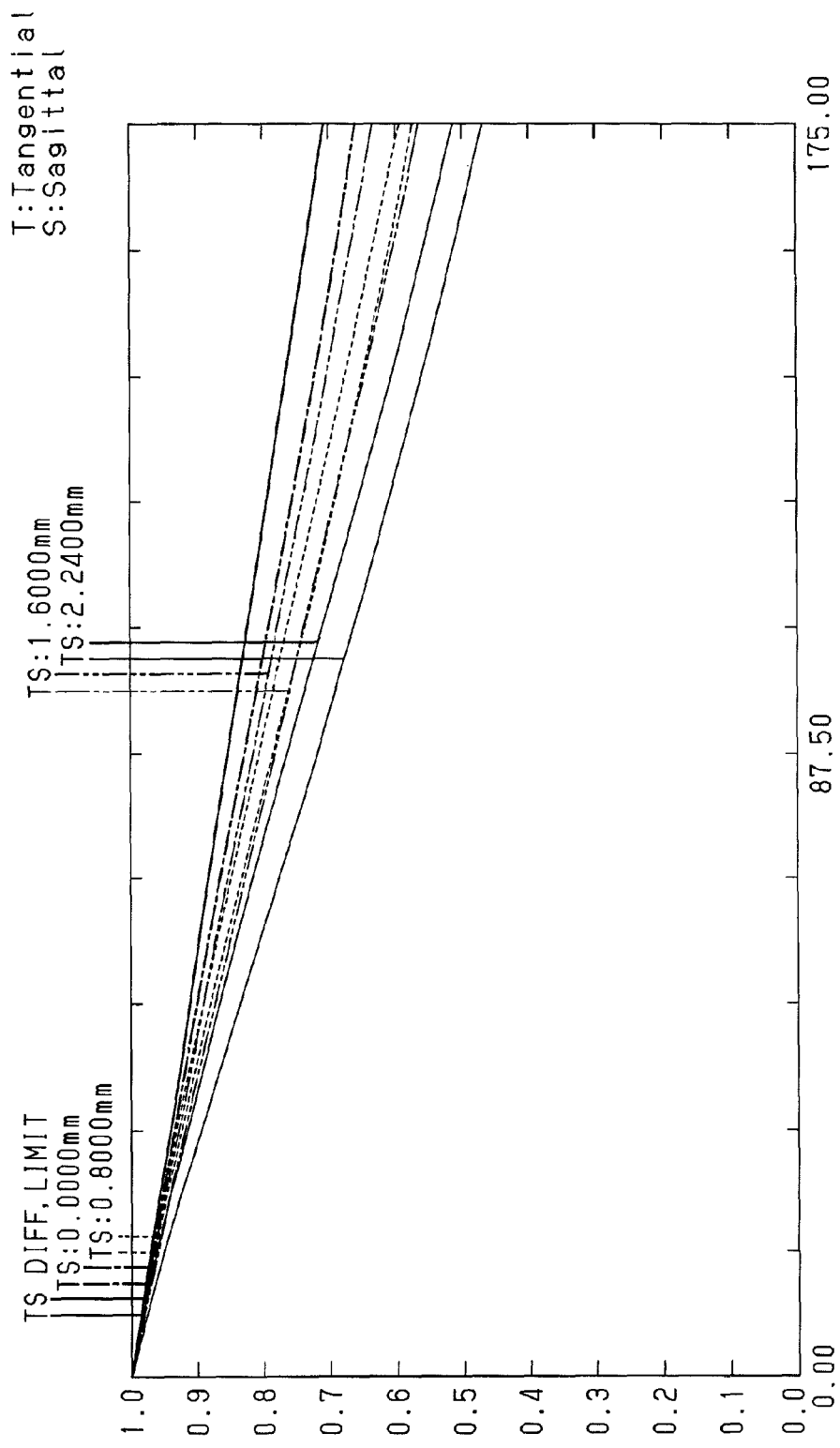
FIG. 14 is a graph illustrating the transfer function (MTF) of the lens unit of example 2.

Referring to FIG. 10, the lens unit of example 2 may also be used for the image capturing device of the above-described embodiment. The design conditions for the lens unit are as shown below.

Focal length of entire system: 3.702 mm

F-number: 2.8

Entire lens length: 4.27 mm

Back focus: 1.19 mm

Effective image height: Φ4.5 mm

The lens data (unit is millimeters) is shown in Table 3. In Table 3, a number i is allocated for each surface in order from the object side of the first lens 1, which serves as the first surface as illustrated in FIG. 10, toward the image side. Further, Ri represents the radius of curvature of each surface, Di represent the distance between the ith surface and the (i+1)th surface, and radius refers to the effective radius.

TABLE 3

| Surface No. | Ri | Di | Material | Radius |
|---|---|---|---|---|
| Object | ∞ | ∞ | | |
| 1* | 1.148 | 0.622 | E48R | 0.815 |
| 2* | 207.103 | 0.019 | | 0.620 |
| 3 (Stop) | ∞ | 0.025 | | 0.540 |
| 4* | 89.257 | 0.326 | SP1516 | 0.575 |
| 5* | 2.794 | 0.454 | | 0.623 |
| 6* | −1.149 | 0.346 | SP1516 | 0.675 |
| 7* | −1.725 | 0.493 | | 0.895 |
| 8* | 1.827 | 0.794 | E48R | 1.578 |
| 9* | 1.974 | 0.092 | | 1.874 |
| 10 | ∞ | 0.300 | B270 | 1.975 |
| 11 | ∞ | 0.795 | | 2.034 |
| 12 | ∞ | 0.000 | | 2.340 |
| Image | ∞ | — | | |

In Table 3, the first lens 1 and the fourth lens 4, which are formed from E48R, are plastic lenses manufactured by Zeon Corporation and have a refractive index nd of 1.531 and an Abbe number vd of 56.0. Further, the second lens 2 and third lens 3, which are formed from SP1516, are plastic lenses formed by Teijin Chemicals Ltd. and have a refractive index nd of 1.6142 and an Abbe number vd of 26.0. Accordingly, the second lens 2 and third lens 3 each have an Abbe number that is smaller than that of the first lens 1 and thereby further increases the chromatic aberration correction effect. The cover glass 6, which is formed from B270, is a glass plate manufactured by Schott AG and has a refractive index nd of 1.523 and an Abbe number vd of 58.6.

The aspherical shape is represented by the formula (I) shown below.

$$z = \frac{(1/R)H^2}{1+\sqrt{\{1-(1+K)(H/R)^2\}}} + A4H^4 + A6H^6 + A8H^8 + A10H^{10} + A12H^{12} + A14H^{14} + A16H^{16} \quad (1)$$

In formula (I), the z axis represents the optical axis, R represents the radius of curvature, H represents the height in a direction perpendicular to the optical axis, and K represents the Korenich constant. Further, A4, A6, A8, A10, A12, A14, and A16 respectively represent the aspherical surface coefficients for the fourth order, sixth order, eighth order, tenth order, twelfth order, fourteenth order, and sixteenth order.

The aspherical surface coefficient of each surface is as shown below in Table 4.

Entire lens length: 4.28 mm
Back focus: 1.21 mm
Effective image height: Φ4.5 mm

Figure 15:
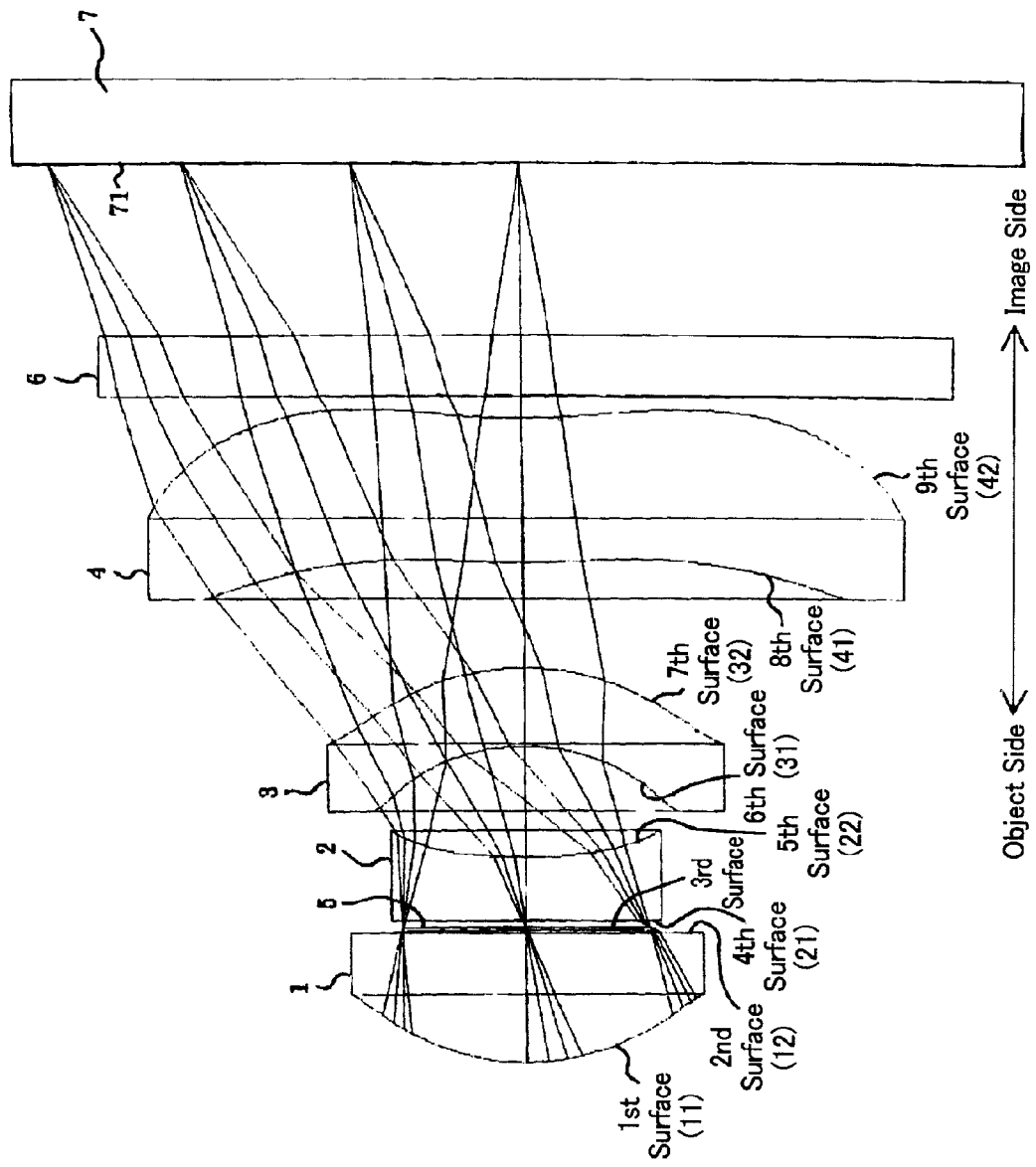
FIG. 15 is a schematic cross-sectional view of a lens unit of example 3 taken along a plane which includes the optical axis of the lens unit.

The lens data (unit is millimeters) is shown in Table 5. In Table 5, a number i is allocated for each surface in order from the object side of the first lens 1, which serves as the first surface as illustrated in FIG. 15, toward the image side. Further, Ri represents the radius of curvature of each surface, Di represent the distance between the ith surface and the (i+1)th surface, and radius refers to the effective radius.

TABLE 5

| Surface No. | Ri | Di | Material | Radius |
|---|---|---|---|---|
| Object | ∞ | ∞ | | |
| 1* | 1.120 | 0.622 | E48R | 0.820 |
| 2* | 279.621 | 0.009 | | 0.645 |
| 3 (Stop) | ∞ | 0.025 | | 0.575 |
| 4* | 18.934 | 0.310 | SP1516 | 0.607 |
| 5* | 2.215 | 0.534 | | 0.627 |
| 6* | −1.034 | 0.383 | SP1516 | 0.705 |
| 7* | −1.285 | 0.502 | | 0.920 |
| 8* | 3.775 | 0.686 | E48R | 1.473 |
| 9* | 2.713 | 0.108 | | 1.749 |
| 10 | ∞ | 0.300 | B270 | 1.915 |
| 11 | ∞ | 0.805 | | 1.975 |
| 12 | ∞ | 0.000 | | 2.240 |
| Image | ∞ | — | | |

In Table 5, the first lens 1 and the fourth lens 4, which are formed from E48R, are plastic lenses manufactured by Zeon Corporation and have a refractive index nd of 1.531 and an Abbe number vd of 56.0. Further, the second lens 2 and third lens 3, which are formed from SP1516, are plastic lenses

TABLE 4

| Ri | K | A4 | A6 | A8 | A10 | A12 | A14 | A16 |
|---|---|---|---|---|---|---|---|---|
| 1st surface | −9.400E−03 | 5.131E−02 | −4.727E−01 | 2.160E+00 | −5.455E+00 | 6.945E+00 | −3.843E+00 | −2.096E−02 |
| 2nd surface | 7.752E+04 | −1.537E−02 | −1.041E−01 | −1.782E−01 | 8.788E−02 | −4.012E−01 | 4.918E−01 | 0 |
| 4th surface | −1.001E+036 | 3.159E−02 | −3.607E−03 | −1.174E−01 | −5.923E−01 | 1.705E+00 | −4.522E−01 | 0 |
| 5th surface | 1.045E−01 | 1.357E−01 | −5.359E−01 | 4.504E+00 | −1.441E+01 | 1.904E+01 | 2.258E+00 | −1.391E+01 |
| 6th surface | −1.651E−01 | −8.150E−01 | 4.473E+00 | −2.452E+01 | 7.070E+01 | −9.014E+01 | 5.310E−01 | 6.656E+01 |
| 7th surface | 6.744E−02 | −5.570E−01 | 1.442E+00 | −3.605E+00 | 6.168E+00 | −5.612E+00 | 2.283E+00 | −1.377E−01 |
| 8th surface | −9.238E−02 | −4.122E−01 | 3.713E−01 | −2.949E−01 | 1.714E−01 | −6.388E−02 | 1.301E−02 | −1.087E−03 |
| 9th surface | −2.373E−02 | −2.486E−01 | 1.253E−01 | −5.799E−02 | 1.516E−02 | −1.730E−03 | −4.671E−05 | 1.374E−05 |

The optical characteristics of the lens units, that is, the spot diaphragm, curvature of field, distortion, longitudinal aberration, and MTF curve are respectively illustrated in FIGS. 11, 12(a), 12(b), 13, and 14.

Example 3

Referring to FIG. 15, the lens unit of example 3 may also be used for the image capturing device of the above-described embodiment. The design conditions for the lens unit are as shown below.
Focal length of entire system: 4.01 mm
F-number: 2.8 formed by Teijin Chemicals Ltd. and have a refractive index nd of 1.6142 and an Abbe number vd of 26.0. Accordingly, the second lens 2 and third lens 3 each have an Abbe number that is smaller than that of the first lens 1 and thereby further increases the chromatic aberration correction effect. The cover glass 6, which is formed from B270, is a glass plate manufactured by Schott AG and has a refractive index nd of 1.523 and an Abbe number vd of 58.6.

The aspherical shape is represented in the same manner as in examples 1 and 2 by formula (I).

The aspherical coefficient of each surface is as shown below in Table 6.

TABLE 6

| Ri | K | A4 | A6 | A8 | A10 | A12 | A14 | A16 |
|---|---|---|---|---|---|---|---|---|
| 1st surface | −1.833E−02 | 5.266E−02 | −5.260E−01 | 2.523E+00 | −6.723E+00 | 8.979E+00 | −5.134E+00 | −1.600E−02 |
| 2nd surface | 0.000E+00 | −3.569E−02 | −9.392E−02 | −1.531E−01 | 6.777E−02 | −7.634E−01 | 1.175E+00 | 0 |
| 4th surface | 0.000E+00 | 1.262E−02 | −1.803E−02 | −1.270E−01 | −5.417E−01 | 2.564E+00 | −2.365E+00 | 0 |
| 5th surface | 1.920E+00 | 1.433E−01 | −6.024E−01 | 5.414E+00 | −1.761E+01 | 2.438E+01 | 3.061E+00 | −1.275E+01 |
| 6th surface | −6.165E−01 | −7.835E−01 | 4.956E+00 | −2.863E+01 | 8.726E+01 | −1.157E+02 | 2.037E+00 | 9.511E+01 |
| 7th surface | −1.784E+00 | −5.115E−01 | 1.492E+00 | −4.199E+00 | 7.657E+00 | −7.218E+00 | 3.043E+00 | −2.794E−01 |
| 8th surface | 1.732E+00 | −3.848E−01 | 4.154E−01 | −3.477E−01 | 2.107E−01 | −8.237E−02 | 1.761E−02 | −1.523E−03 |
| 9th surface | 1.137E−01 | −2.621E−01 | 1.488E−01 | −6.994E−02 | 1.867E−02 | −2.157E−03 | −5.323E−05 | 1.259E−05 |

Figure 16:
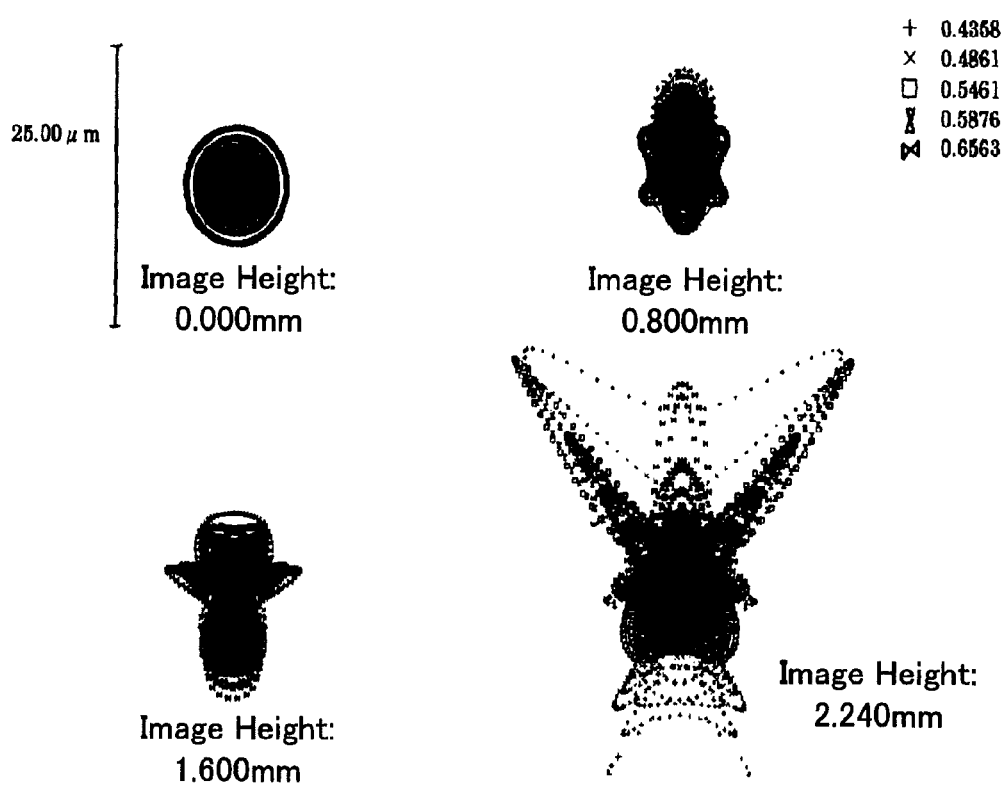
FIG. 16 is a spot diagram illustrating the lens unit of example 3.
Figure 17:
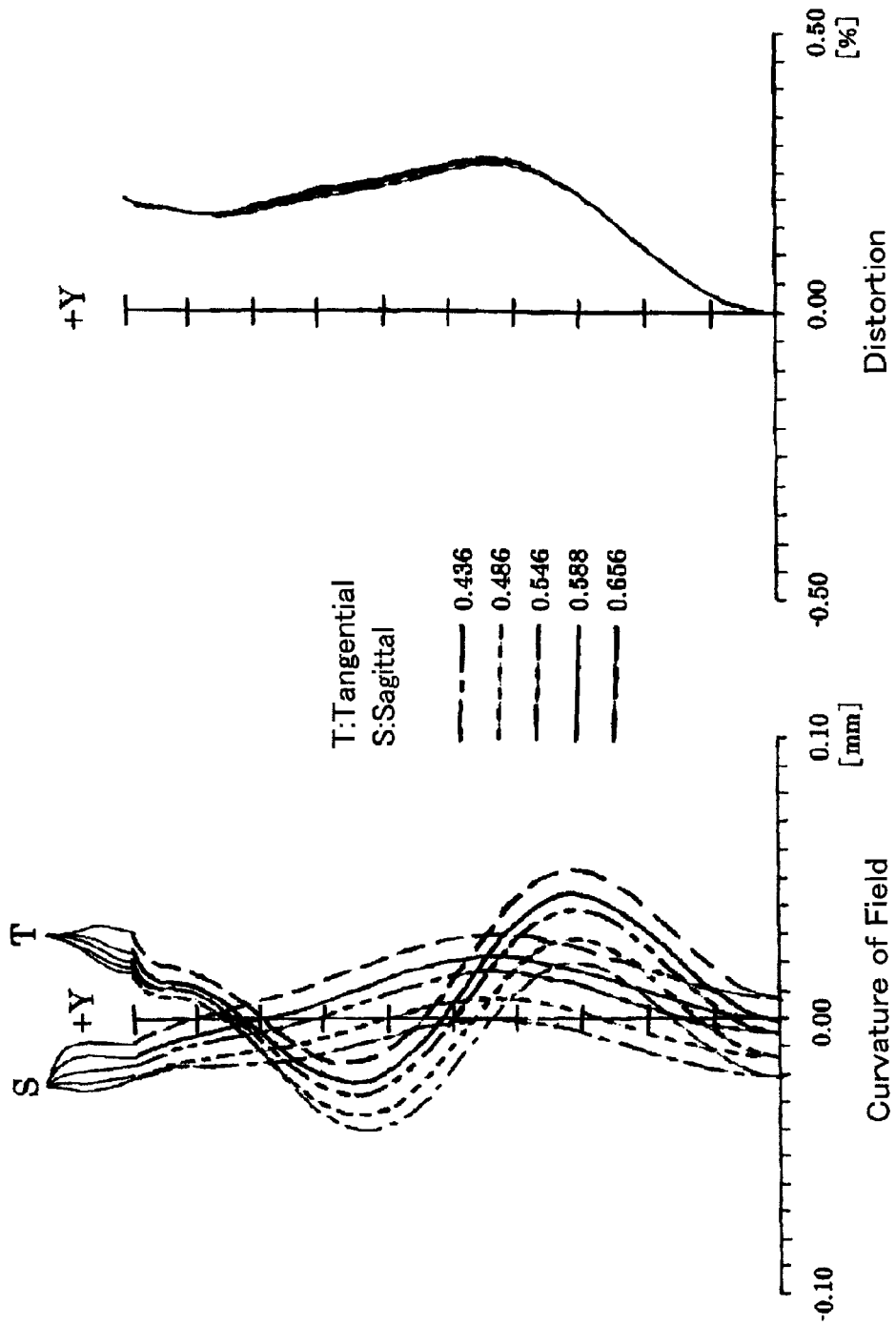
FIGS. 17(a) and 17(b) are graphs respectively illustrating the curvature of field and distortion in the lens unit of example 3.
Figure 18:
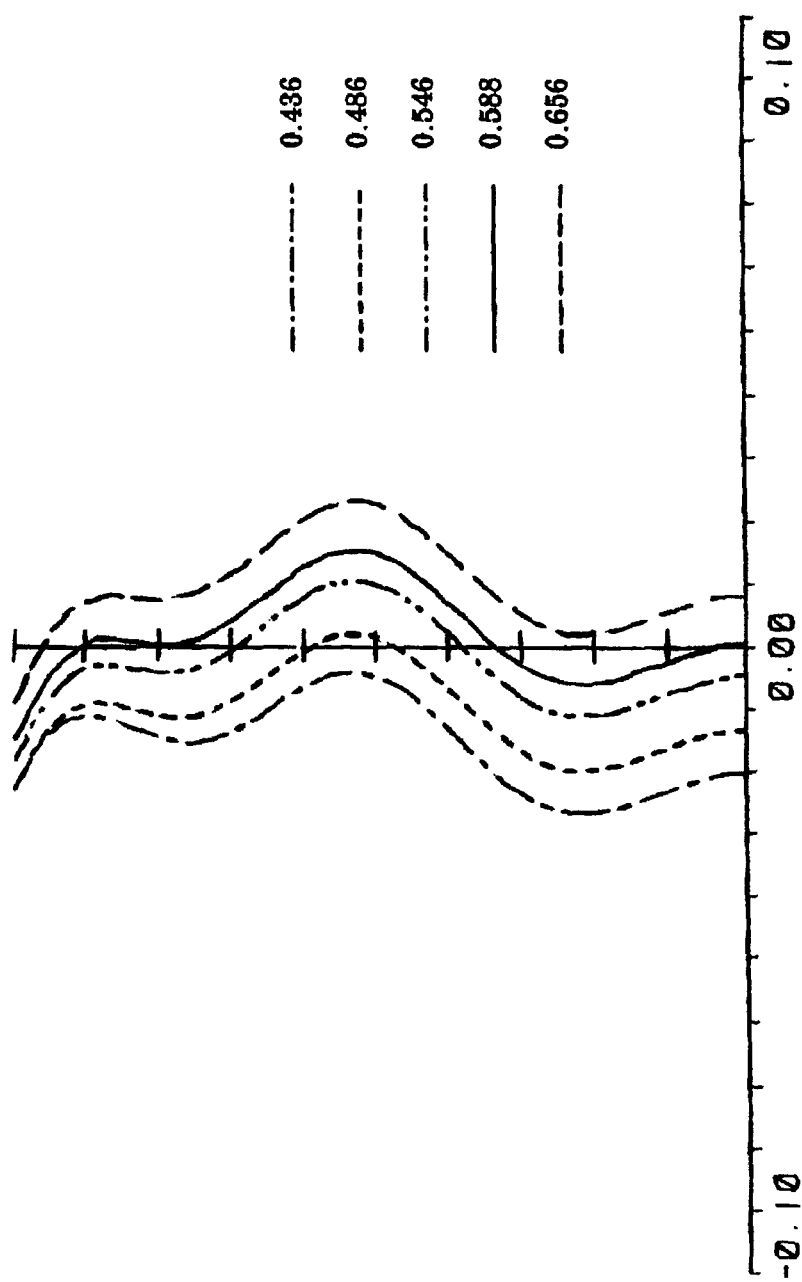
FIG. 18 is a graph illustrating the longitudinal aberration in the lens unit of example 3.
Figure 19:
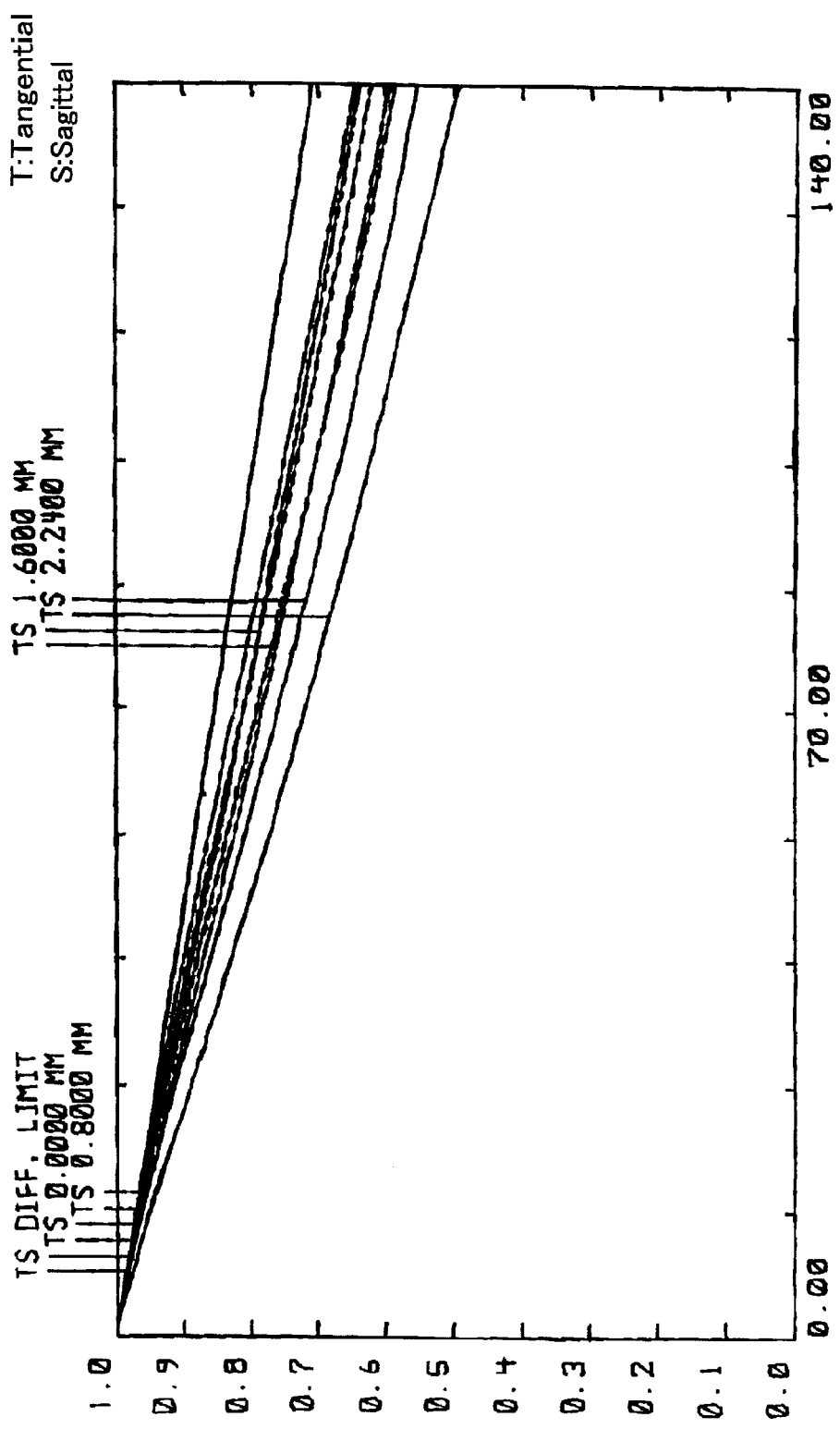
FIG. 19 is a graph illustrating the transfer function (MTF) of the lens unit of example 3.

The optical characteristics of the lens units, that is, the spot diaphragm, curvature of field, distortion, longitudinal aberration, and MTF curve are respectively illustrated in FIGS. 16, 17(*a*), 17(*b*), 18, and 19.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A lens unit comprising:
   a first lens, an aperture stop, a second lens, a third lens, and a fourth lens arranged in order from an object side to an image side, wherein:
   the first lens is a meniscus lens having positive power;
   the second lens is a meniscus lens including a convex object side surface and having negative power;
   the third lens is a meniscus lens including a convex image side surface and having negative power; and
   the fourth lens is aspherical, includes an image side surface and an object side surface, and has at least one inflection point on each of the image side surface and object side surface, with the image side surface having a concave surface facing toward the image side, wherein the fourth lens has positive power.

2. The lens unit according to claim 1, wherein the second lens and the third lens each have an Abbe number smaller than that of the first lens.

3. The lens unit according to claim 1, wherein the first lens is a frontmost lens.

4. The lens unit according to claim 1, wherein the lens unit has a four-lens structure.

5. An image capturing device comprising a lens unit, said lens unit including:
   a first lens, an aperture stop, a second lens, a third lens, and a fourth lens arranged in order from an object side to an image side, wherein:
   the first lens is a meniscus lens having positive power;
   the second lens is a meniscus lens including a convex object side surface and having negative power;
   the third lens is a meniscus lens including a convex image side surface and having negative power; and
   the fourth lens is aspherical, includes an image side surface and an object side surface, and has at least one inflection point on each of the image side surface and object side surface, with the image side surface having a concave surface facing toward the image side, wherein the fourth lens has a positive power.

\* \* \* \* \*